June 27, 1939.                C. H. BISSELL                2,163,864
                          VARIABLE CAM STRUCTURE
                            Filed Oct. 12, 1937
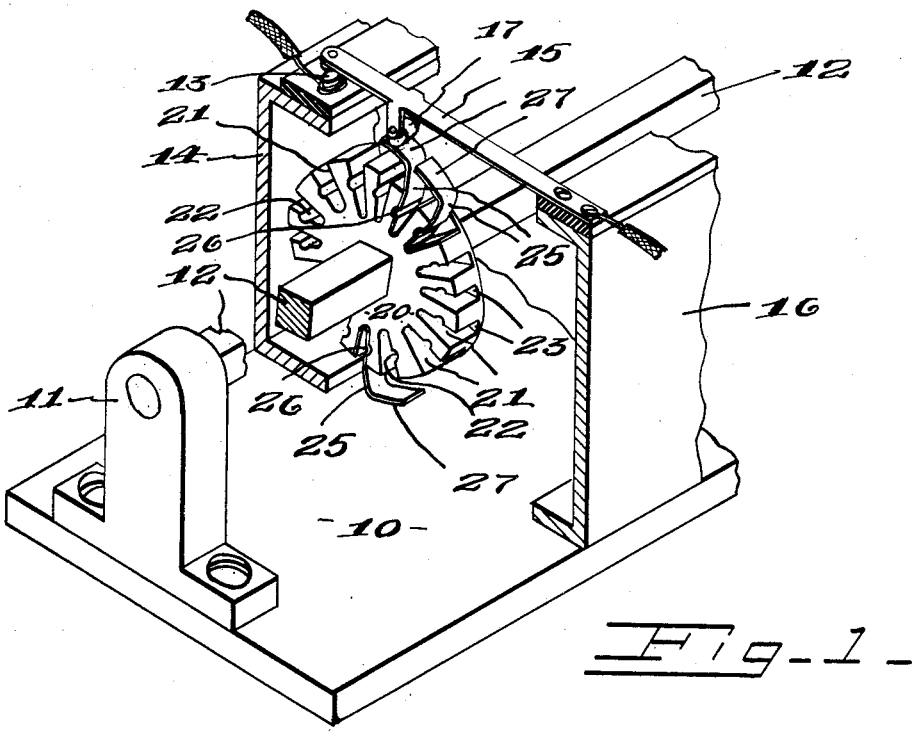
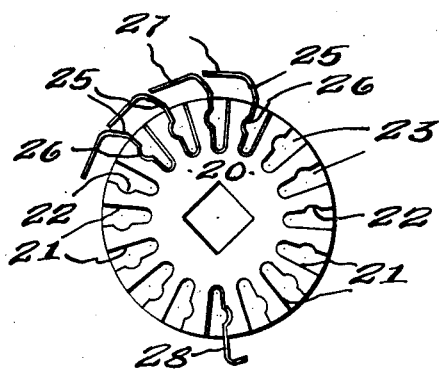
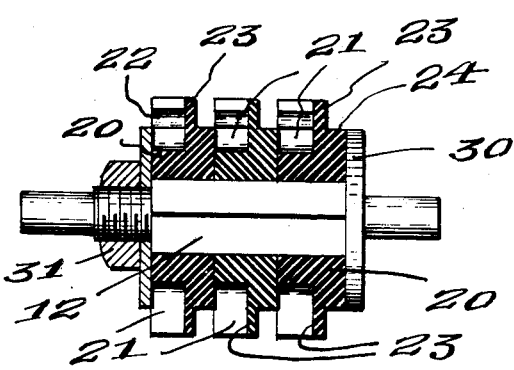
INVENTOR.
Carl H. Bissell
BY Bodrell & Thompson
ATTORNEYS.

Patented June 27, 1939

2,163,864

UNITED STATES PATENT OFFICE 2,163,864

VARIABLE CAM STRUCTURE

Carl H. Bissell, Syracuse, N. Y., assignor to Crouse-Hinds Company, Syracuse, N. Y., a corporation of New York Application October 12, 1937, Serial No. 168,617

6 Claims. (Cl. 74—567)

This invention relates to cam structures, and more particularly to a variable or adjustable cam structure wherein the lobe or high portion of the cam may be varied in length, or the lobes varied in number, or adjusted circumferentially relative to the cam shaft.

The invention has as an object, a variable cam structure of particularly simple and economical construction, by which the lobe or high portion of the cam can be quickly and conveniently varied or adjusted without disassembling the apparatus or machine in which the cam is used, and which adjustment or variation may be effected without the use of any special tools.

The invention consists in the novel features and in the combinations and constructions hereinafter set forth and claimed.

In describing this invention, reference is had to the accompanying drawing in which like characters designate corresponding parts in all the views.

Figure 1 is a perspective view, partly in section, of a portion of an electrical timing switch illustrating a use of my invention.

Figure 2 is an end elevational view of one of the cams shown in Figure 1.

Figure 3 is a sectional view of a cam structure employing three cams of the type shown in Figures 1 and 2.

The invention consists generally of a disk mounted upon a shaft and rotatable therewith and being formed with a plurality of radially extending slots and cam lobe members detachably mounted in said slots.

My cam structure may be employed advantageously in any apparatus or machine in which it is desirable to have the cam readily adjustable. In Figure 1 is shown a portion of an electrical switch as an illustrated example of an apparatus in which my cam structure may be employed.

As here shown, the switch or timer comprises a base 10 on which is mounted one or more bearings 11 and in which is rotatably journalled a shaft 12. The stationary contact 13 of the switch is mounted upon a suitable support 14, and the movable contact 15 upon a similar support 16. The movable contact 15 is provided intermediate its ends with a follower roller 17.

The cam structure per se consists of a disk 20 which, when the cam is used in connection with electrical apparatus, may be formed of a molded insulating material. Preferably the shaft 12 is of non-cylindrical formation, and the cam disk 20 is formed with a central aperture complemental to the shape of the shaft 12, whereby the disk is rotatable with the shaft and avoids the necessity of set screws, or other similar securing means. As here illustrated, the shaft 12 and the central aperture of the disk 11 are of square formation, thus permitting circumferential adjustment of the cam or disk 20 relative to the shaft 12, or to the other disk mounted on the shaft.

The disk 20 is formed with a plurality of circumferentially spaced apart radially extending slots 21, one side of each slot being formed with an axially extending groove 22. Preferably, the slots 21 open through one side face of the disk 20, but do not extend through the thickness of the disk, or open on the opposite side thereof. That is, one side of the slots 20 are closed by a wall 23. As here shown, the side of the disk adjacent the wall 23 is formed with a narrow hub 24 of sufficient diameter to overlie the bottom or inward portion of the slots 20 of the adjacent disk when a plurality of disks are mounted upon the shaft 12, as indicated in Figure 3.

The members 25, which form the lobe or high portion of the cam, are insertable in the slots 21 and are detachably secured to the disk 20. The members 25 are preferably formed of resilient material, such as spring steel or spring bronze, and one end portion is of substantially U shaped formation, the legs or sides of the U formation pressing against opposite sides of the slots 21, and one leg is formed or provided with a bead 26 which engages the groove 22 when the members are inserted in the slots 21. The U formation is initially formed of greater width than the width of the slots 21, whereby the legs of the U formation are pressed toward each other when the members are inserted in the slots and the outward pressure of the legs against the sides of the slots in cooperation with groove 22 and bead 26 detachably secure the lobe members to the disks.

The opposite end of the members 25 extend radially outwardly beyond the periphery of the disk 20, and are formed with a tail portion 27 which extends circumferentially, or substantially circumferentially, with the periphery of the disk and in spaced apart relationship thereto. The tail piece 27 is of such length as to extend to the tail piece of the cam lobe member arranged in the adjacent slot 21. That is, the length of the lobe is determined by the number of lobe members 25 arranged in adjacent slots. Accordingly, any number of lobe members desired may be inserted in the slots 21 to produce a lobe surface of the desired length, and these members may be inserted in any series of adjacent slots relative to the formation of the central aperture of the disk, thereby positioning the lobe portion of the cam relatively to the cam shaft and to the lobe portions on the other disks mounted upon the shaft. If an extremely short lobe is desired, the tail portion of the lobe member may be formed of less length, as indicated by the lobe member 28, Figure 2.

It is often desirable in cam operated apparatus to vary the position of the lobe of one cam relative to another, and to increase or decrease the length of the lobe. An example of such apparatus is a traffic signal timer, or a sign flasher. In traffic signaling, it is often desirable to change the timing of the signals at a particular intersection, or to change the timer from a two-street apparatus to a three-street, etc. Heretofore, such changes could be made only by disassembling the timing apparatus, with the exception of varying the length of the lobe which could be done in some instances by shifting the lobe surfaces of the cams. However, such shifting was necessarily of a limited extent and accomplished by an expensive and complicated mechanism, and often a sufficient adjustment could not be made without disassembling the apparatus. With my invention, it is only necessary to remove and insert the cam lobe members 18 by radial movement relative to the disk, and this may be accomplished without the use of any tools.

In Figure 3, I have illustrated the mounting of a plurality of disks on the shaft 12. This mounting structure is extremely simple, consisting of a fixed collar 30 located adjacent one end of the shaft, the opposite end of which is threaded to receive the nut 31. The disks 20 are slidably mounted upon the shaft 12, and are held against the collar 30 by nut 31 and washer 32. It will be apparent that upon removal of the shaft 12 from the apparatus, it is only necessary to remove the nut 31 and all of the disks 20 may be quickly removed from the shaft 12 and their relative positions shifted when remounted on the shaft. Obviously, the shaft 12 may be made of such length as to accommodate any desired number of cam disks.

What I claim is:

1. A variable cam structure comprising a shaft, a plurality of disks mounted thereon, said disks being individually adjustable to different radial positions relative to said shaft and being formed with a plurality of radially extending slots, cam lobe members insertable in said slots and being formed with a U shaped formation with the legs of the U formation yieldingly engaging the side walls of said slots to detachably secure said members to the disks, and said members being formed with a lobe surface extending circumferentially of the disks and forming a continuation of the lobe surface of its adjacent member.

2. A variable cam structure comprising a shaft, a plurality of disks mounted thereon and being rotatable therewith, each of said disks being adjustable to different radial positions relative to said shaft, each disk being formed with a plurality of radially extending slots opening through one side of the disk, cam lobe members formed with a U shaped end portion insertable in said slots, and the sides of said U formation yieldingly engaging the side walls of the slots to detachably secure the lobe members to the disks, each of said disks overlapping the inner portion of said slots in the adjacent disk, said cam lobe members having a lobe surface extending circumferentially and in spaced apart relationship to the periphery of the disks, and means carried by the shaft and cooperable with said disks to prevent relative axial movement of the same.

3. A variable cam structure including a disk formed with a plurality of radially extending slots of like form, a cam lobe member having a resilient U shaped end portion insertable in said respective slots, with the legs of the U portion yieldingly engaging the sides of said slots and being cooperable therewith to detachably secure the cam lobe member to the disk, and said cam lobe member also having a portion forming a lobe surface extending circumferentially of the disk and in spaced apart relation to the periphery thereof.

4. A variable cam structure including a disk formed with a plurality of radially extending slots of like form, a plurality of cam lobe members, each having a resilient U shaped end portion insertable in said respective slots, with the legs of the U portion yieldably engaging the sides of said slots and being cooperable therewith to detachably secure the cam lobe members to the disk, each of said cam lobe members also having a portion forming a lobe surface extending circumferentially of the disk and in spaced apart relation thereto, and forming a continuation of the lobe surface of the member arranged in the adjacent slot.

5. A variable cam structure including a disk formed with a plurality of radially extending slots of like form, a plurality of cam lobe members, each having a resilient U shaped end portion insertable in said respective slots with the legs of the U portion yieldingly engaging the sides of said slots, one leg of said U portion and the adjacent side of the slot having means cooperable to detachably interlock the lobe member to the disk, each of said lobe members being also provided with a lobe surface extending circumferentially of the periphery of the disk in spaced apart relation thereto and forming a continuation of the lobe surface of the member arranged in the adjacent slot.

6. A variable cam structure including a disk formed with a plurality of radially extending slots of like form, a plurality of cam lobe members each having a resilient U shaped end portion insertable in said respective slots, the legs of the U portion yieldably engaging the sides of said slots, one leg of the U portion terminating adjacent the periphery of the disk, and the opposite leg and the adjacent side of the slot having means cooperable to detachably interlock the lobe member to the disk, and said latter leg extending outwardly from the periphery of the disk and substantially concentric therewith to form a cam lobe surface.

CARL H. BISSELL.